United States Patent
Smith et al.

(10) Patent No.: US 7,793,687 B2
(45) Date of Patent: Sep. 14, 2010

(54) INFLATION/DEFLATION ADAPTOR ASSEMBLY FOR INFLATING AND DEFLATING INFLATABLE CARGO DUNNAGE BAGS

(75) Inventors: Rodney S. Smith, Franklin, TN (US); Thomas C. Keenan, Brentwood, TN (US); Joel L. Kennedy, Mt. Pleasant, TN (US); Johnny Buchanan, Mt. Pleasant, TN (US)

(73) Assignee: Illinois Tool Works Inc., Glenview, IL (US)

( * ) Notice: Subject to any disclaimer, the term of this patent is extended or adjusted under 35 U.S.C. 154(b) by 349 days.

(21) Appl. No.: 12/007,527

(22) Filed: Jan. 11, 2008

(65) Prior Publication Data

US 2009/0179167 A1 Jul. 16, 2009

(51) Int. Cl.
*F16K 11/085* (2006.01)
(52) U.S. Cl. ............ 137/625.22; 137/223; 137/625.47; 137/867; 137/887; 137/894; 141/66
(58) Field of Classification Search ............ 251/83, 251/149.9, 215, 218, 274, 311; 141/65, 66; 137/223, 231, 233, 234, 614.06, 625.22, 137/625.47, 862, 867, 887, 888, 894
See application file for complete search history.

(56) References Cited

U.S. PATENT DOCUMENTS

| | | | | |
|---|---|---|---|---|
| 1,369,555 A | * | 2/1921 | Schweinert et al. | 137/228 |
| 1,710,128 A | * | 4/1929 | Welch | 137/625.16 |
| 2,592,759 A | * | 4/1952 | Sullivan | 141/95 |
| 3,808,981 A | | 5/1974 | Shaw | |
| 4,146,070 A | | 3/1979 | Angarola et al. | |
| 4,591,519 A | | 5/1986 | Liebel | |
| 5,042,541 A | | 8/1991 | Krier et al. | |
| 5,082,244 A | | 1/1992 | Krier et al. | |
| 5,111,838 A | | 5/1992 | Langston | |
| 5,522,430 A | * | 6/1996 | Mittersteiner Urzua | 137/625.47 |
| 5,839,488 A | | 11/1998 | Peters | |
| 6,138,711 A | | 10/2000 | Lung-Po | |
| 7,073,545 B2 | * | 7/2006 | Smith et al. | 141/285 |

* cited by examiner

*Primary Examiner*—John Rivell
*Assistant Examiner*—Jeremy S Baskin
(74) *Attorney, Agent, or Firm*—Law Offices of Steven W. Weinrieb

(57) ABSTRACT

An inflation/deflation assembly, which can be mounted upon the inflation valve assembly of an inflatable bag, so as to permit both the inflation and deflation of the inflatable as may be desired. The inflation/deflation assembly comprises an outer housing, and a control rod is rotatably disposed within the housing so as to be rotatably movable between two positions angularly spaced apart from each other. When the control rod is disposed, for example, at a first one of the two positions, the inflatable bag can be inflated, whereas, when the control rod is disposed at the second one of the two positions, the inflatable bag can be deflated.

12 Claims, 6 Drawing Sheets

Jan. 21, 1992, the entire disclosure of which is incorporated herein by reference. As can best be appreciated from FIG. 1, which substantially corresponds to FIG. 5 of the Krier et al. patent, the inflatable cargo dunnage bag is seen to comprise first and second sheets 16,24 between which is interposed an inflatable bladder 22. An inlation valve assembly 28 is fixedly secured to the inflatable bladder 22 and passes through the sheet 24 so as to effectvey define an external connection to a source of compressed or pressurized air in order to permit the inflatable bladder 22 to be inflated with the pressurized or compressed air. More particularly, the inflation valve assembly 28 comprises a tubular valve body 30 which has an axially oriented passageway 32 extending therethrough, and an annular flange 34 which is located inside and affixed to an internal surface portion of the inflatable bladder 22 so as to define a sealed connection therewith. An annular valve seat 36 is disposed at the lower end portion of the valve body 30, and the upper end portion of the valve body 30 comprises first and second frustoconically shaped sections 38,40. An annular ring member 42 is interposed between the frustoconically shaped section 40 and the external surface portion of the sheet 24 so as to effectively secure the valve body 30 in place upon the inflatable cargo dunnage bag as a result of clamping the sheet 24 and the upper wall portion of the inflatable bladder 22 between the annular ring member 42 and the annular flange 34.

Continuing further, it is seen that the inflation valve assembly 28 also comprises a valve stem 44 which is disposed within the axially oriented passageway 32, and that the valve stem 44 terminates in an annular closure plate 46 which is disposed within the inflatable bladder 22. In addition, it is seen that the annular closure plate 46 has an upstanding annular ridge 48 formed thereon which is adapted to be seated upon the annular valve seat 36 when the inflation valve assembly 28 is disposed at its closed position. A coil spring member 50 is annularly disposed around the valve stem 44 so as to in fact normally bias the annular flange 34 and the valve seat 36 downwardly toward the closed position into engagement with the annular closure plate 46. Furthermore, it is also seen that an inflator assembly 54 is adapted to be removably mounted upon the inflation valve assembly 28 so as to in fact achieve inflation of the inflatable bladder 22 when desired. More particularly, the inflator assembly 54 comprises a main body portion 56, an annular member 58 that is threadedly mounted upon a lower end region of the main body portion 56, and an annular collar 60 which is also mounted upon the main body portion 56 so as to effectively surround the annular member 58 and be vertically movable with respect to the annular member 58 as a result of annular groove 62 and annular flange 64 structure respectively formed upon the main body portion 56 and the annular collar 60 which permits the annular flange 64 to move in the axial direction within the annular groove 62. It is further seen that the main body portion 56 comprises a main axially oriented through bore or fluid passageway 66, and that the upper end portion of the fluid passageway is internally threaded as at 68 so as to provide a threaded connection to a source of compressed air, such as, for example, a compressed air hose, not shown. The lower end portion of the main body portion 56 terminates in an annular portion 70 that is adapted to be engaged with or seated upon the upper end portion 52 of the valve stem 44 when the inflator assembly 54 is mounted upon the inflation valve assembly 28, and it is noted that the upper end portion 52 of the valve stem 44 is structured so as to permit air to pass therethrough from the fluid passageway 66 into the axially oriented passageway 32. Still yet further, a plurality of detent

INFLATION/DEFLATION ADAPTOR ASSEMBLY FOR INFLATING AND DEFLATING INFLATABLE CARGO DUNNAGE BAGS

FIELD OF THE INVENTION

The present invention relates generally to inflatable cargo dunnage bags, and more particularly to a new and improved inflation/deflation adaptor assembly, which can be mounted upon the inflation valve assembly of the inflatable cargo dunnage bag so as to permit both the inflation and deflation of the inflatable cargo dunnage bag as may be necessary or desired in connection with the placement and disposition of the cargo dunnage bag between individual cargo loads, wherein the new and improved inflation/deflation adaptor assembly comprises an outer housing, and a control knob-control rod sub-assembly, which is rotatably disposed within the outer housing so as to be rotatably movable between two positions which are angularly spaced apart from each other by means of an angle of 90°, whereby when the control knob-control rod sub-assembly is disposed, for example, at a first one of the two positions, incoming compressed air is permitted to flow through an axially oriented passageway fluidically connected to the inflation valve assembly so as to inflate the inflatable cargo dunnage bag, whereas, conversely, when the control knob-control rod sub-assembly is disposed at the second one of the two positions, the incoming compressed air will effectively cause vacuum conditions to be developed across the axially oriented passageway so as to cause air to be withdrawn from the inflatable cargo dunnage bag thereby deflating the same.

BACKGROUND OF THE INVENTION

Inflatable cargo dunnage bags are used within the cargo shipment or transportation industry as a means for readily and easily securing or bracing cargo within the holds of, for example, railroad cars, ships, airplanes, truck trailers, and the like. Such inflatable cargo dunnage bags conventionally comprise an inflatable bladder which is enclosed within an outer bag or envelope which can be conventionally fabricated from a variety of materials and which may have different structures. In general, however, such inflatable cargo dunnage bags are conventionally of such construction and size as to readily enable the same to be inserted into voids or spaces defined between spaced loads, or between a particular cargo load and a side or end wall of the cargo container or hold, whereupon inflation of the inflatable cargo dunnage bag, the inflatable cargo dunnage bag will expand thereby fixedly engaging the adjacent cargo loads, or the cargo load and the container wall, so as to secure the cargo loads against undesirable movement during transit. Obviously, in order to achieve the inflation of the inflatable cargo dunnage bags to a predetermined pressurized level, such inflatable cargo dunnage bags are conventionally provided with an inflation valve assembly so as to permit pressurized air or compressed air to be conducted into the interior portion of the inflatable bladder so as to inflate the same, or to permit the pressurized air or compressed air, already disposed within the inflated bladder, to be exhausted out from the interior portion of the inflatable bladder so as to deflate the same when, for example, the usage of the inflatable cargo dunnage bags has been completed, that is, when the cargo loads are to be unloaded at, for example, the transportation or shipment terminal.

One conventional inflation valve assembly is disclosed within U.S. Pat. No. 5,082,244 which issued to Krier et al. on balls 72 are mounted upon the annular member 58 so as to be radially movable between radially inner and radially outer positions.

Accordingly, when, for example, the annular collar 60 is moved downwardly with respect to annular member 58, the detent balls 72 will be forced radially inwardly so as to ride over the circumferential edge portion 78 of the first frusto-conically shaped section 38 and be disposed within an annular detent region 80 defined between the first and second frusto-conically shaped sections 38,40, thereby locking the inflator assembly 54 upon the inflation valve assembly 28. In addition, the engagement of the detent balls 72 within the annular detent region 80 will force the tubular valve body 30 to move upwardly with respect to the valve stem 44, while the lower annular portion 70 of the main body portion 56 remains engaged with the upper end portion 52 of the valve stem 44. Accordingly, the coil spring member 50 is axially compressed and the valve seat 36 is disengaged from the annular closure plate 46, thereby opening the inflation valve assembly 28 so as to permit the compressed air to pass through the fluid passageway 66 of the inflator assembly 54 and the passageway 32 of the valve body 30 so as to inflate the inflatable bladder 22. Conversely, when the annular collar 60 is moved upwardly with respect to annular member 58, the detent balls 72 will be permitted to move radially outwardly so as to the inflator assembly 54 to be disengaged from the inflation valve assembly 28. It is lastly noted that the annular member 58 also has an O-ring member 74 disposed upon an internal peripheral surface portion thereof for sealing engagement with the first frustoconically shaped section 38, and that an external flange portion 76 is integrally formed upon the annular collar 60 so as to facilitate the axial movement of the annular collar 60 with respect to the annular member 58.

It is noted that, in connection with the employment of such inflatable cargo dunnage bags, certain regulatory associations, commissions, agencies, governing bodies, and the like, have promulgated particular rules or regulations concerning the actual usage of such inflatable cargo dunnage bags. For example, the American Association of Railroads has mandated that such inflatable cargo dunnage bags cannot be reused once they have in fact been used in connection with the transportation or shipping of a particular cargo load. The reason for this is effectively based upon safety considerations in that, during the course of a particular shipment of cargo, the inflatable cargo dunnage bags will undoubtedly be subjected to various forces which, while not necessarily destroying the inflatable cargo dunnage bags, such forces will nevertheless compromise their structural integrity to a certain degree, thereby rendering their reuse a safety hazard from the point of view of properly protecting or securing future cargo loads. On the other hand, during the course of the initial usage of the inflatable cargo dunnage bags, the inflatable cargo dunnage bags are in fact permitted to be repositioned. For example, when the inflatable cargo dunnage bags are initially being positioned between different cargo loads in order to brace or stabilize the same, it sometimes happens that the cargo loads may shift their positions.

Accordingly, it is desired to reposition the inflatable cargo dunnage bags in order to better brace or stabilize the cargo loads at their newly shifted positions. This procedure therefore requires that the inflated cargo dunnage bags be deflated, repositioned, and again inflated once the cargo dunnage bags have in fact been located or repositioned at the newly desired locations or positions with respect to the particular cargo loads. With conventional inflation valve assemblies, such as, for example, the aforenoted inflation valve assembly 28 as disclosed within FIG. 1 and the aforenoted patent to Krier et al., such conventional inflation valve assemblies do not readily, easily, and quickly permit the rapid deflation of the inflatable cargo dunnage bags in order to permit the inflatable cargo dunnage bags to be readily, easily, and quickly repositioned. Conventionally, for example, the inflatable cargo dunnage bags must be manually deflated as a result of, for example, the inflation valve assembly being manually manipulated to its open position so as to permit the air disposed within the inflated cargo dunnage bags to escape. Obviously, this is a very difficult, tedious, and time-consuming operation. Alternatively, the inflatable cargo dunnage bag to be repositioned is simply cut open, the air permitted to escape, the bag is removed from its original position with respect to the load and discarded, and a new inflatable cargo dunnage bag is inserted at the desired location. Obviously, this procedure is quicker and easier but results in the destruction and waste of a substantial number of inflatable cargo dunnage bags.

Accordingly, a need exists in the art for a new and improved inflatable cargo dunnage bag wherein, once the same has in fact been inflated, the same can be readily, easily, and quickly deflated as may be required or desired in order to, for example, reposition the inflatable cargo dunnage bag with respect to the particular cargo load in order to properly secure, brace, or stabilize the cargo load, and wherein such deflation of the inflatable cargo dunnage bag does not involve the destruction of the inflatable cargo dunnage bag or the compromising of its structural integrity in any manner.

SUMMARY OF THE INVENTION

The foregoing and other objectives are achieved in accordance with the teachings and principles of the present invention through the provision of a new and improved inflation/deflation adaptor assembly which can be mounted upon the inflation valve assembly of the inflatable cargo dunnage bag so as to permit both the inflation and deflation of the inflatable cargo dunnage bag as may be necessary or desired in connection with the placement and disposition of the cargo dunnage bag between individual cargo loads. More particularly, the new and improved inflation/deflation adaptor assembly comprises an outer housing which is structurally similar to the main body portion of the conventional PRIOR ART inflator assembly and is adapted to effectively be snap-fitted onto the inflation valve assembly in the same manner, however, a control knob-control rod sub-assembly is rotatably disposed within the housing so as to be rotatably movable between two positions angularly spaced apart from each other through means of an angle of 90°.

Accordingly, when the control knob-control rod subassembly is disposed, for example, at a first one of the two positions, incoming compressed air is permitted to flow through an axially oriented passageway fluidically connected to the inflation valve assembly so as to inflate the inflatable cargo dunnage bag. Conversely, however, when the control knob-control rod sub-assembly is disposed at the second one of the two positions, the incoming compressed air will effectively pass diametrically through the inflation/deflation adaptor assembly so as to cause vacuum conditions to be developed across the axially oriented passageway and thereby cause air to be withdrawn from the inflatable cargo dunnage bag so as to thereby deflate the same.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 2:
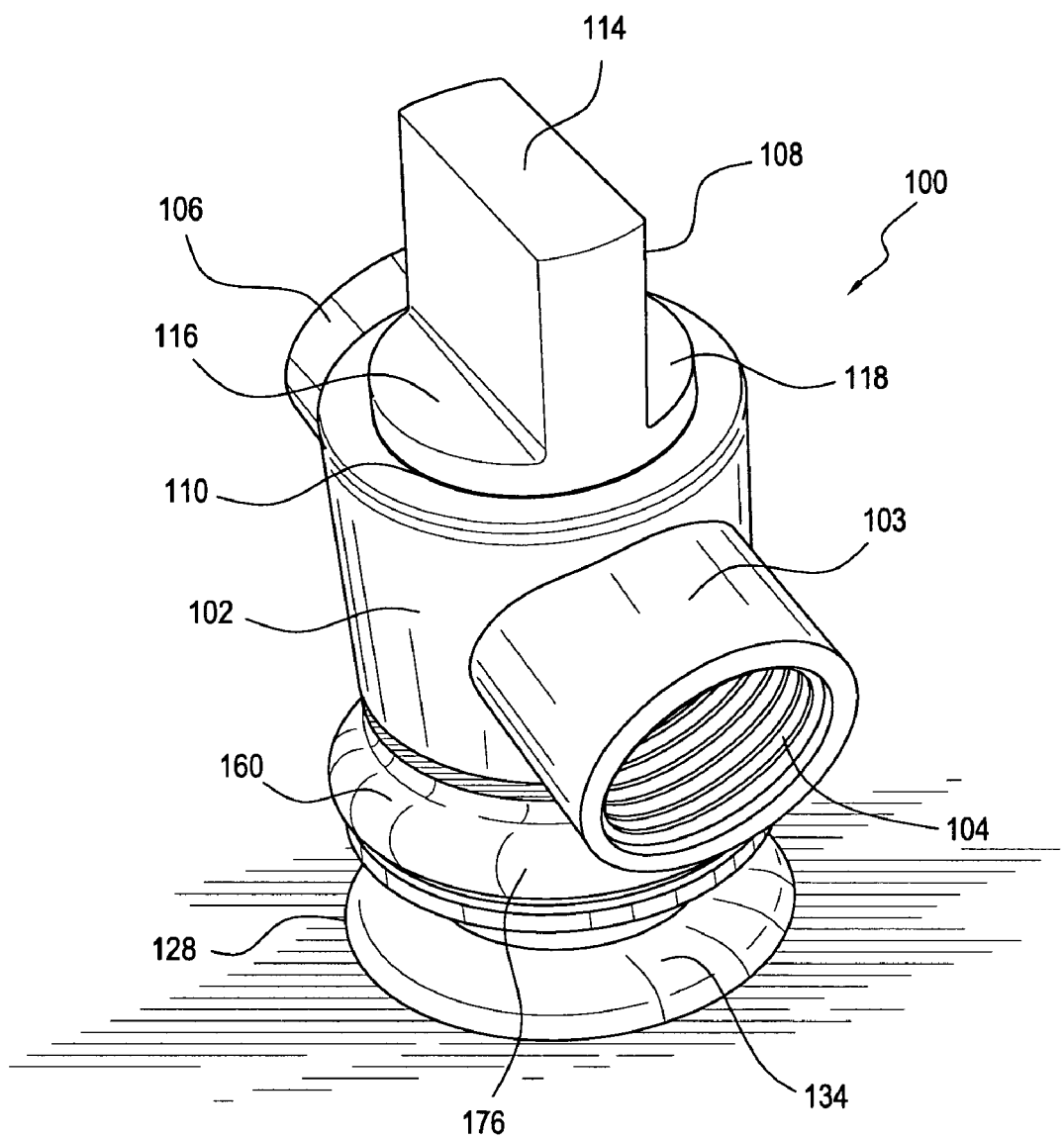
FIG. 2 is a perspective view of a new and improved inflation/deflation adaptor assembly, as constructed in accordance with the principles and teachings of the present invention, and shown mounted upon the inflation valve assembly of an inflatable cargo dunnage bag when the inflation-deflation adaptor assembly is disposed at its first inflate position.
Figure 3:
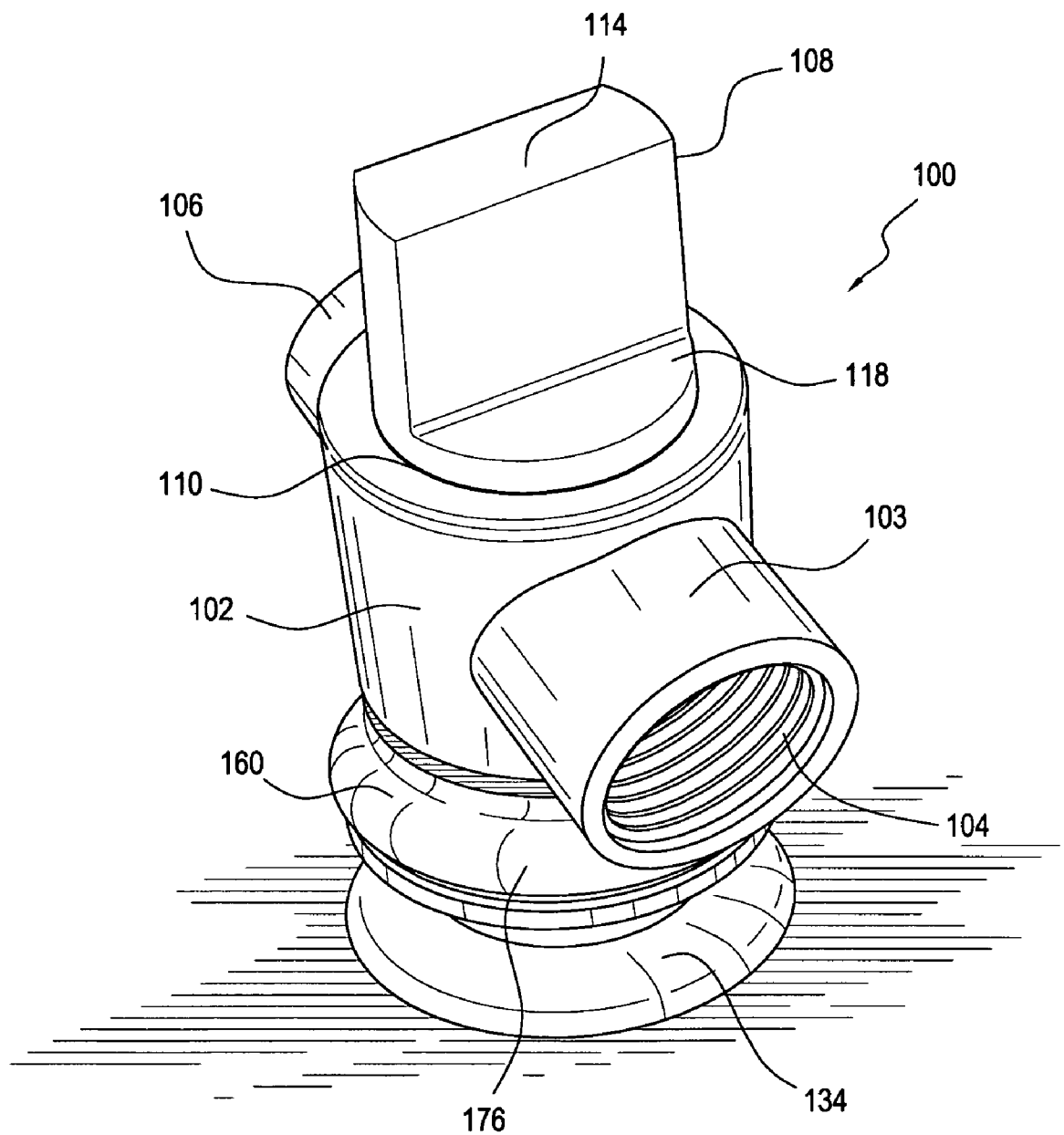
FIG. 3 is a perspective view of the new and improved inflation/deflation adaptor assembly, as disclosed within FIG. 2, showing, however, the inflation/deflation adaptor assembly disposed at its second deflate position.

Referring now to the drawings, and more particularly to FIGS. 2-3 thereof, a new and improved inflation/deflation adaptor assembly, as constructed in accordance with the principles and teachings of the present invention and showing the cooperative parts thereof, is illustrated and is generally indicated by the reference character 100. It is to be noted that the new and improved inflation/deflation adaptor assembly 100 comprises an assembly which is similar in structure to the conventional PRIOR ART inflator assembly 54 as disclosed within the aforenoted patent to Krier et al., and therefore, where appropriate, component parts of the new and improved inflation/deflation adaptor assembly 100 of the present invention, which correspond to similar component parts of the conventional PRIOR ART inflator assembly 54 as disclosed within the aforenoted patent to Krier et al., will be designated by corresponding reference characters except that they will be within the 100 series. More particularly, for example, the new and improved inflation/deflation adaptor assembly 100 is adapted to be removably mounted upon an inflation valve assembly 128, which comprises an annular flange 134 which is adapted to be located inside and affixed to an internal surface portion of the inflatable bladder so as to define a sealed connection therewith, in a manner similar to that disclosed within the aforenoted patent to Krier et al. More specifically, for example, a plurality of detent balls, not shown but similar to the detent balls 72 of Krier et al., are utilized wherein the detent balls would be moved between their radially inwardly and radially outward positions as caused or permitted by means of an annular collar 160 which is adapted to be manually manipulated, by means of an external flange portion 176 integrally formed upon the annular collar 160, so as to be movable along an annular member similar to the annular member 58 of Krier et al.

Continuing further, it is to be appreciated, however, that in accordance with the principles and teachings of the present invention, the new and improved inflation/deflation adaptor assembly 100 is quite different from the inflator assembly 54 of Krier et al. in that the new and improved inflation/deflation adaptor assembly 100 is structured for use with, for example, the inflation valve assembly 128 so as to permit both the inflation and deflation of an inflatable cargo dunnage bag. More particularly, for example, it is seen that the new and improved inflation/deflation adaptor assembly 100 comprises an external annular or tubular housing 102, which is similar to the main body portion 56 of the inflator assembly 54 of Krier et al. and is therefore adapted to effectively be snap-fitted onto the inflation valve assembly 128 in the manner that has been previously discussed, wherein the lower end portion of the tubular housing 102 will have a lower annular end portion, similar to the annular end portion 70 of the inflator assembly 54 of Krier et al., that is adapted to be engaged with or seated upon the upper end portion 52 of the valve stem 44 when the tubular housing 102 is in fact mounted upon the inflation valve assembly 28. However, this is where the basic similarities between the new and improved inflation/deflation adaptor assembly 100 and the inflator assembly 54 of Krier et al. effectively end.

For example, it is seen that the external annular or tubular housing 102 is not provided with an axially oriented internally threaded compressed air inlet port, similar to that disclosed at 68 within the Krier et al. patent, for threadedly mating with a compressed air hose, but, to the contrary, the external annular or tubular housing 102 is provided with a first radially oriented outwardly projecting tubular fitting 103 which is internally threaded for threadedly mating with a compressed air hose so as to define a compressed air inlet port 104. In addition, the external housing 102 is also provided with a second radially oriented outwardly projecting tubular fitting 106, which is located diametrically opposite the air inlet port 104, so as to effectively define a deflation air outlet or exhaust port, not visible or illustrated. Still further, as can also be readily appreciated from FIGS. 2-3, the new and improved inflation/deflation adaptor assembly 100 also comprises an axially oriented control knob-control rod sub-assembly 108 which is adapted to be rotatably mounted, within an axially oriented bore 110 which is defined within the external tubular housing 102 and which is similar to the axially oriented through bore or fluid passageway 66 of Krier et al., so as to be angularly rotatable, as will become more apparent hereinafter, between two defined angularly spaced positions. It is to be noted or appreciated that the tubular housing 102 is also provided with a first air inlet port, not visible or illustrated, and a second air outlet port, also not visible or illustrated, whereby, as will become more apparent hereinafter, air can be respectively directed into the inflation/deflation adaptor assembly 100, and toward the inflation valve assembly similar to the inflation valve assembly 28 of Krier et al., through means of the tubular fitting 103 and the first air inlet port of the tubular housing 102, so as to inflate the inflatable bladder, as well as directed out from the inflatable bladder and the inflation/deflation adaptor assembly 100 through means of the tubular fitting 106 and the second air outlet port of the tubular housing 102 so as to deflate the inflatable bladder.

More particularly, the control knob-control rod sub-assembly 108 is seen to comprise an axially oriented control rod 112, which can best be seen within FIGS. 4-7 and which is rotatably disposed within the axially oriented bore 110 defined within the external tubular housing 102 in a substantially closely-toleranced manner, and a control knob 114, which has a configuration which is substantially that of a rectangular parallelepiped. The control knob 114 extends or projects axially upwardly from the upper surface portion 116 of a radially outwardly extending flanged head member 118, which is integrally formed upon the end portion of the control rod 112, so as to be capable of being easily grasped and manipulated by means of an operator. The head member 118 is always disposed externally of the housing 102 and its axial bore 110. Accordingly, when the control knob-control rod subassembly 108 is disposed at its first position as illustrated within FIG. 2, and as will become more apparent hereinafter, the new and improved inflation/deflation adaptor assembly 100 will be disposed at its inflate state or position so as to in fact permit the inflatable bladder of the inflatable cargo dunnage bag to be inflated, whereas, conversely, when the control knob-control rod sub-assembly 108 is disposed at its second position as illustrated within FIG. 3, as will also become more apparent hereinafter, the new and improved inflation/deflation adaptor assembly 100 will be disposed at its deflate position or state so as to in fact permit the inflatable bladder of the inflatable cargo dunnage bag to be deflated.

With reference now being made to FIGS. 4-7, a detailed description of the control knob-control rod sub-assembly 108 will now be provided. More particularly, it is seen that the control rod 112 has a main axially oriented fluid passageway 120 formed therewithin so as to effectively provide the control rod 112 with a hollow, annular, or tubular construction, and that the control rod 112 has a substantially stepped cross-sectional configuration wherein the lower end portion of the stepped control rod 112 defines an axially extending annular portion 122 which is adapted to engage the upper surface portion 52 of the valve stem 44. As will become more apparent hereinafter, the lower end portion 122 of the control rod 112 will actually effectively maintain the valve stem 44 at its downward position so as to in fact ensure that the valve closure plate 46 is unseated with respect to the valve seat 36 when the control knob-control rod sub-assembly 108 of the inflation/deflation adaptor assembly 100 is disposed at its deflate position. In addition, a first, radially oriented compressed air inlet bore 124 is defined within a first side wall portion of the annular or tubular control rod 112 and is fluidically connected to the main axially oriented fluid passageway 120. In a similar manner, a second, radially oriented compressed air inlet bore 126 is also defined within a second side wall portion of the annular or tubular control rod 112 so as to likewise be fluidically connected to the main axially oriented fluid passageway 120, and a third, radially oriented air outlet or exhaust bore 128 is similarly defined within a third side wall portion of the annular or tubular control rod 112 so as to also be fluidically connected to the main axially oriented fluid passageway 120. It is noted that the second and third bores 126,128 are coaxially aligned with respect to each other, and in this manner, the second and third bores 126,128, together with the region of the main fluid passageway 120 which is interposed between the second and third bores 126, 128, effectively define a through-passageway. In addition, it is also noted that the common axis defined by means of the second and third bores 126,128 is disposed perpendicular to the axis of the first, radially oriented compressed air inlet bore 124.

Figure 1:
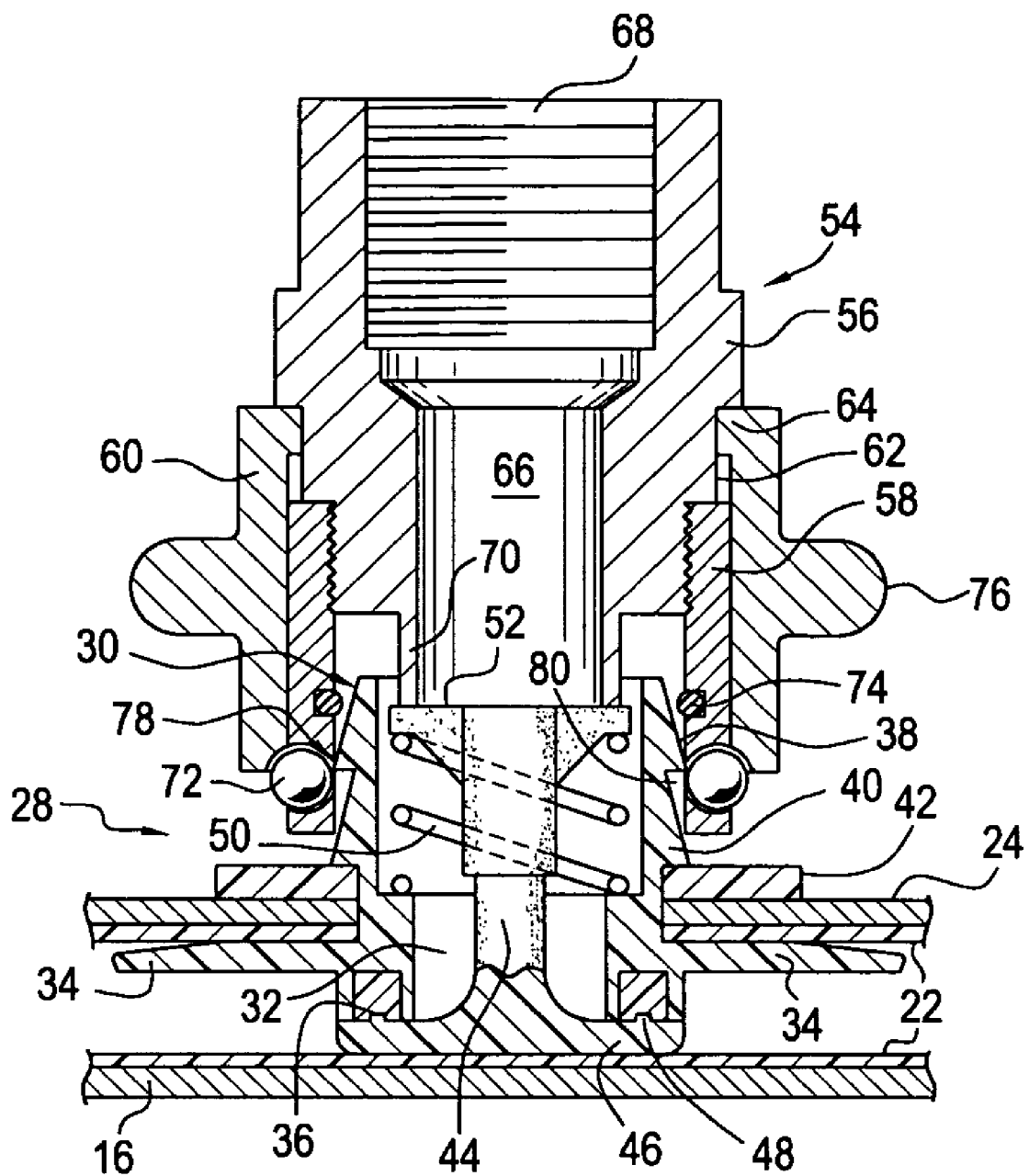
FIG. 1 is a cross-sectional view of a conventional, PRIOR ART inflator-inflation valve assembly.

Accordingly, when the control-knob control-rod subassembly 108 is disposed at its first inflate position as illustrated within FIG. 2, the first, radially oriented compressed air inlet bore 124 will be coaxially aligned with both the air inlet port, not shown, defined within the external tubular housing 102 and the air inlet fitting 103 so as to receive incoming compressed air from the compressed air hose threadedly connected to the air inlet fitting 103. It is also noted that the side wall portion of the tubular control rod 112 which is disposed diametrically opposite the first compressed air inlet bore 124 is not provided with a bore and therefore comprises a solid wall portion, and since the second and third bores 126,128 are both effectively blocked off by means of internal peripheral wall portions of the external tubular housing 102, the compressed air, flowing in through the air inlet fitting 103, must flow into the main axially oriented fluid passageway 120 and toward the inflation valve assembly, not shown but similar to the inflation valve assembly 28 of Krier et al. as disclosed within FIG. 1, whereby the inflatable bladder will in fact be inflated. Conversely, when the control-knob control-rod sub-assembly 108 is angularly rotated in the clockwise direction, when considered from the viewpoint looking vertically downwardly upon the new and improved inflation/deflation adaptor assembly 100 as illustrated within FIGS. 2 and 3, through an angular movement of approximately 90° and is therefore disposed at its second deflate position as illustrated within FIG. 3, the first, radially oriented compressed air inlet bore 124 will now, in effect, be facing and will effectively be blocked off by means of a solid internal peripheral wall portion of the external tubular housing 102.

To the contrary, however, the second, radially oriented compressed air inlet bore 126 will now be coaxially aligned with the air inlet port, not shown but defined within the internal peripheral wall surface portion of the external tubular housing 102, as well as with the air inlet fitting 103 so as to in fact receive incoming compressed air from the compressed air hose threadedly connected to the air inlet fitting 103. Still further, and in a similar manner, the third, radially oriented air outlet or exhaust bore 128 will now be coaxially aligned with the air outlet port, not shown but defined within the internal peripheral wall surface portion of the external tubular housing 102 opposite the air inlet port defined within the internal peripheral wall surface portion of the external tubular housing 102, as well as with the air outlet fitting 106 defining the deflation air outlet or exhaust port, not visible or illustrated, so as to in fact receive outgoing or exhaust air from the inflatable bladder whereby the inflatable bladder may be readily deflated.

It is to be noted that when the control knob-control rod sub-assembly 108 is in fact rotated in the clockwise direction so as to permit deflation of the inflatable bladder, the pressure, characteristic of the compressed air disposed within the inflatable bladder, will already tend to cause the compressed air, disposed within the inflatable bladder, to escape out from the inflatable bladder, through the inflation valve assembly similar to the inflation valve assembly 28 of Krier et al., and into the main fluid passageway 120 of the control rod 112. Still further, it is to be additionally appreciated that the compressed air flowing into and radially through the first compressed air inlet fitting 103, through the second, radially oriented compressed air inlet bore 126 defined within the second side wall portion of the control rod 112, across the main fluid passageway 120 of the control rod 112, through the third, radially oriented air outlet or exhaust bore 128 defined within third side wall portion of the control rod 112, and out through the Second outlet fitting 106, will effectively cause a relatively high speed flow of air to flow through the aforenoted fittings and bores. This relatively high speed flow of air, in turn, causes vacuum conditions to be developed within the main fluid passageway 120 of the control rod 112 so as to in fact induce the compressed air, disposed within the inflatable bladder, to be withdrawn and evacuated from the inflatable bladder, thereby deflating the same. It is also to be noted that in view of the closely-toleranced disposition of the control rod 112 within the bore 110 of the external housing 102, sealing structure is not normally required in order to achieve the aforenoted inflation and deflation operations, however, if the need for such sealing structure arises, suitable sealing structure, such as, for example, O-ring type seals, can be provided.

Figure 4:
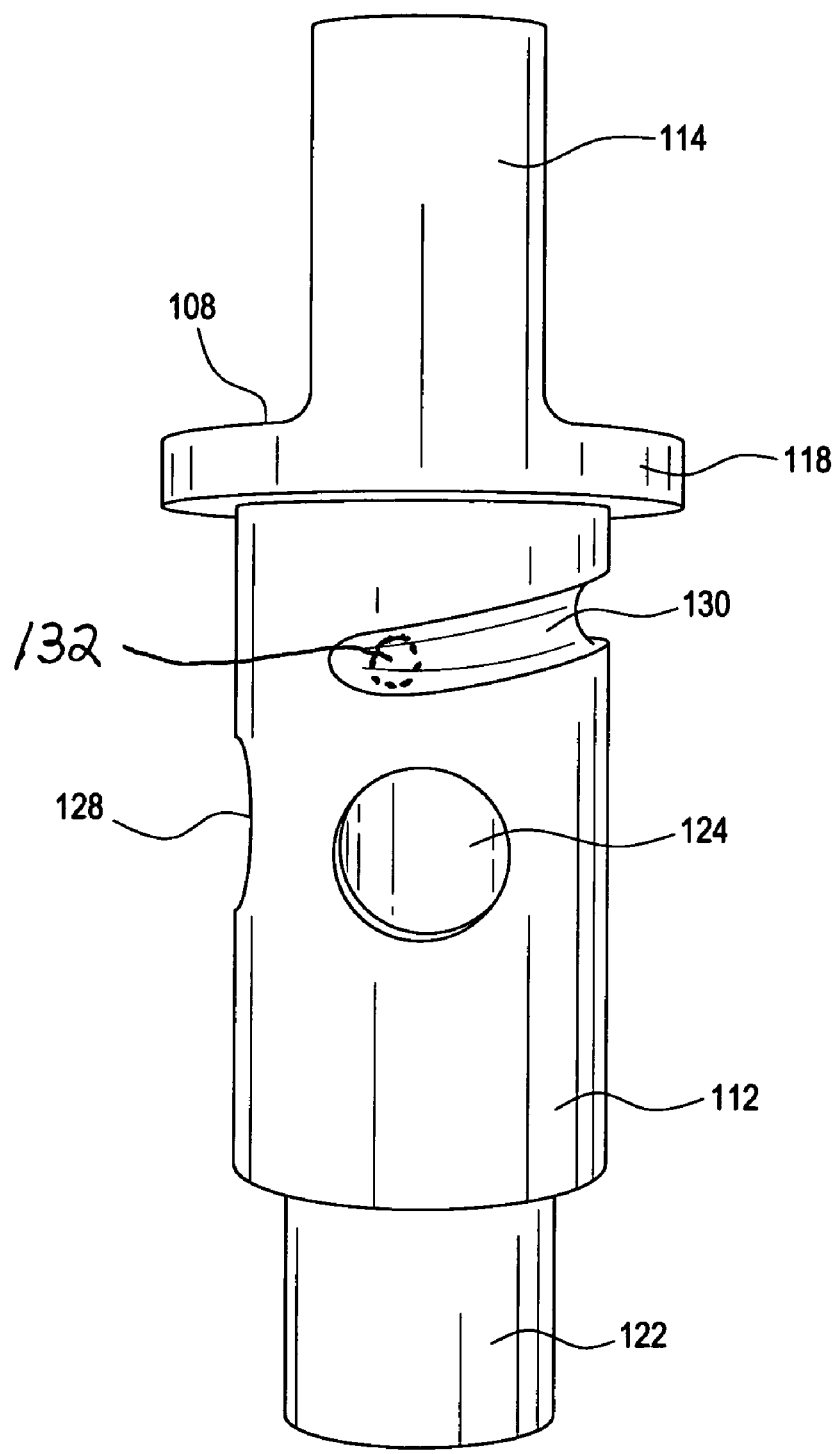
FIG. 4 is a side elevational view of the new and improved control knob-control rod element, component, or subassembly of the new and improved inflation/deflation adaptor assembly wherein the control knob-control rod element, component, or sub-assembly is disposed at its first one of two angularly rotatable positions with respect to its longitudinal axis so as to illustrate the air inflation port defined within a first side wall portion of the rotatable control rod.
Figure 5:
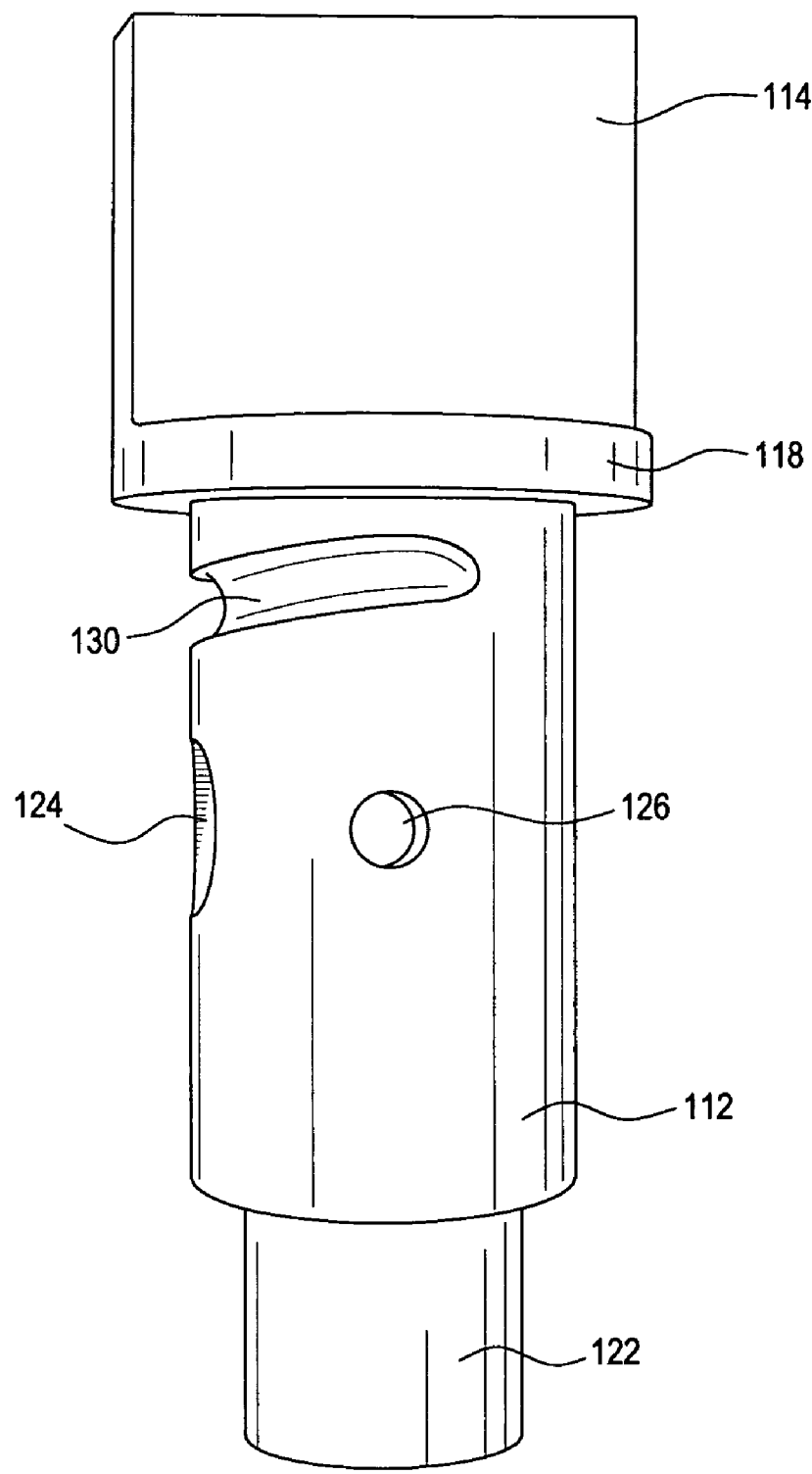
FIG. 5 is a side elevational view of the new and improved control knob-control rod element, component, or sub-assembly of the new and improved inflation/deflation adaptor assembly, similar to that of FIG. 4, wherein, however, the control knob-control rod element, component, or subassembly is disposed at its second one of two angularly rotatable positions with respect to its longitudinal axis so as to illustrate the air intake deflation port defined within a second side wall portion of the rotatable control rod which is angularly displaced from the air inflation port, as illustrated within FIG. 4, by means of an angular separation of 90°.
Figure 6:
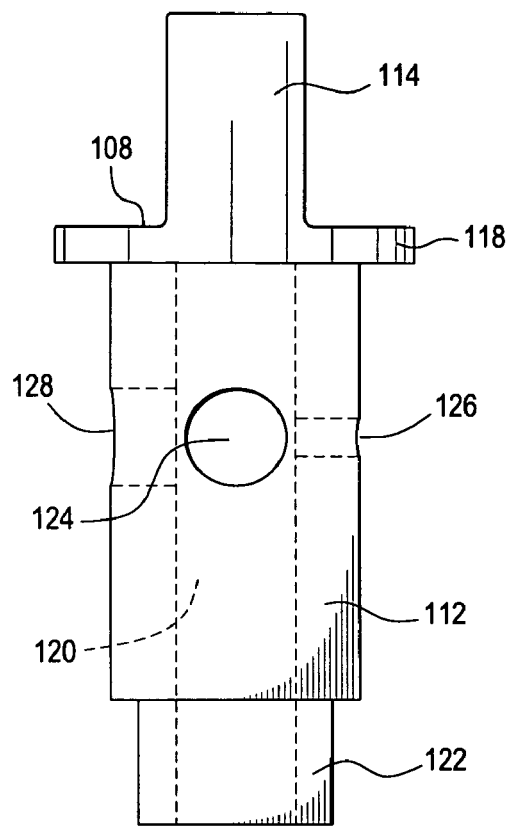
FIG. 6 is a schematic illustration of the control knob-control rod element, component, or sub-assembly of the new and improved inflation/deflation adaptor assembly, as disposed, for example, at its first angular position corresponding to that of FIG. 4, illustrating the various fluid passages as defined internally within the control rod portion of the control knob control rod element, component, or subassembly of the new and improved inflation/deflation adaptor assembly in order to achieve inflation of the inflatable cargo dunnage bag.
Figure 7:
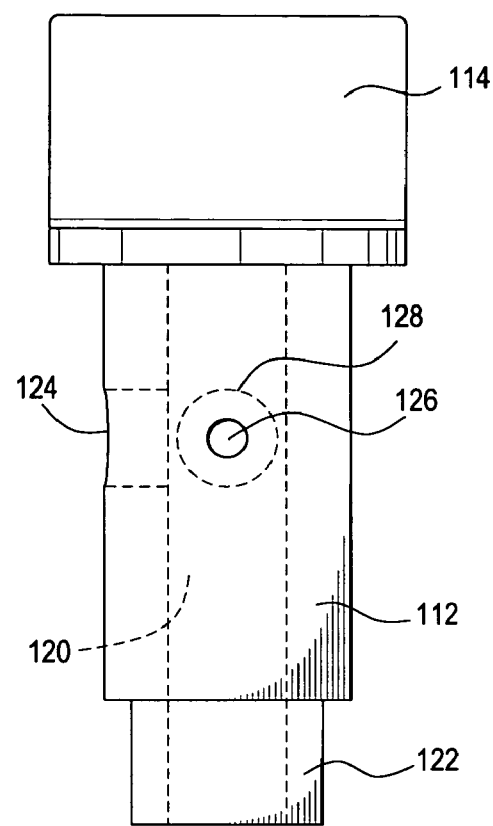
FIG. 7 is a schematic illustration of the control knob-control rod element, component, or sub-assembly of the new and improved inflation/deflation adaptor assembly as disposed, for example, at its second angular position corresponding to that of FIG. 5 and likewise illustrating the various fluid passages as defined internally within the control rod portion of the control knob-control rod element, component, or sub-assembly of the new and improved inflation deflation adaptor assembly in order to achieve deflation of the inflatable cargo dunnage bag.

With reference lastly being made specifically to FIGS. 4 and 5, it is seen that a substantially spiral-configured control track 130 is defined within an upper external surface portion of the control rod 112 so as to have an angular peripheral extent of approximately 90°. More particularly, it is seen that the substantially spiral-configured control track 130 extends, for example, from the first side wall portion of the control rod 112, within which the first, radially oriented compressed air inlet bore 124 is defined, to the second side wall portion of the control rod 112 within which the second compressed air inlet bore 126 is defined. It is also noted that the first terminal end of the substantially spiral-configured track 130, which is located upon the first side wall portion of the control rod 112 within which the first, radially oriented compressed air inlet bore 124 is defined, is disposed at an elevational level which is beneath the location of the second opposite terminal end of the substantially spiral-configured track 130 which is located upon the second side wall portion of the control rod 112 within which the second, radially oriented compressed air inlet bore 126 is defined. A detent type lug, 132 fixedly disposed upon an internal peripheral wall surface portion of the external housing 102, is adapted to be seated within the substantially spiral-configured track 130 such that as the control knob-control rod subassembly 108 is angularly rotated between its inflation and deflation positions or states as disclosed within FIGS. 4 and 5, the detent lug 132 will effectively cooperate with the substantially spiral-configured track 130 so as to effectively define the ends of the angular or rotatable travel movements of the control-knob control rod sub-assembly 108 so as to accurately define the inflation and deflation positions or states of the inflation-deflation adaptor assembly 100.

It is lastly noted that, as a result of the angular movement of the control-knob control-rod sub-assembly 108 between the aforenoted angularly spaced inflate and deflate positions or states, and as a result of the aforenoted spiral-configured track 130, the different elevational locations of the terminal end portions of the spiral-configured track, and the cooperation of the spiral-configured track with the detent lug 132 of the external housing 102, the control knob-control rod subassembly 108 will also undergo a predetermined amount of vertically oriented or axial movement within and with respect to the external housing 102. More particularly, when the control-knob control rod subassembly 108 is moved to its deflation position or state, the control-knob control rod subassembly 108 will actually move axially downwardly with respect to the external housing 102 such that the lower annular end portion 122 of the control rod 112 will engage, for example, the upper end portion 52 of valve stem 44 of the inflation valve assembly 28 of Krier et al. so as to ensure the fact that the closure plate 46 of the valve stem 44 is maintained at its unseated position with respect to the valve seat 36. If this structural interoperative relationship was not in fact developed, the substantially large vacuum forces, as described hereinbefore, would tend to force the closure plate 46 of the valve stem 44 onto the valve seat 36, thereby effectively preventing the escape of the compressed air, disposed within the inflatable bladder, out from the inflatable bladder in order to in fact deflate the inflatable bladder.

Thus, it may be seen that in accordance with the principles and teachings of the present invention, there has been disclosed a new and improved inflation/deflation adaptor assembly, which can be mounted upon the inflation valve assembly of the inflatable cargo dunnage bag so as to permit both the inflation and deflation of the inflatable cargo dunnage bag as may be necessary or desired in connection with the placement and disposition of the cargo dunnage bag between individual cargo loads. More particularly, the new and improved inflation/deflation adaptor assembly comprises an outer housing, and a control knob-control rod subassembly which is rotatably disposed within the housing so as to be rotatably movable between two positions angularly spaced apart from each other through means of an angle of 90°. Accordingly, when the control knob-control rod subassembly is disposed, for example, at a first one of the two positions, incoming compressed air is permitted to flow through an axially oriented passageway fluidically connected to the inflation valve assembly so as to inflate the inflatable cargo dunnage bag, whereas, conversely, when the control knob-control rod subassembly is disposed at the second one of the two positions, the incoming compressed air will effectively pass diametrically through the inflation/deflation adaptor assembly so as to cause vacuum conditions to be developed across the axially oriented passageway and thereby cause air to be withdrawn from the inflatable cargo dunnage bag so as to thereby deflate the same.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An inflator/deflator mechanism for use in conjunction with an inflation valve fixedly secured upon an inflatable member to be inflated, comprising:
 a housing to be mounted upon an inflation valve;
 an axial bore defined within said housing;
 a compressed air inlet port defined upon a first side wall portion of said housing for permitting compressed air to enter said housing from a source of compressed air;

a compressed air outlet port defined upon a second side wall portion of said housing so as to be fluidically connectable to said compressed air inlet port defined upon said first side wall portion of said housing for permitting compressed air, entering said housing from the source of compressed air and through said compressed air inlet port, to exit said housing through said compressed air outlet port as a result of the compressed air traversing said axial bore defined within said housing; and a control rod, rotatably disposed within said axial bore of said housing between first and second angularly spaced positions, and having fluid passageways defined therein for permitting compressed air to be conducted from said compressed air inlet port of said housing, through said control rod, and toward the inflation valve, when said control rod is disposed at said first position, so as to therefore inflate the inflatable member, and for inducing the air, disposed within the inflatable member, to be evacuated from the inflatable member, through said control rod, and out through said compressed air outlet port of said housing, as a result of compressed air flowing from said compressed air inlet port defined within said first side wall portion of said housing, across said axial bore defined within said housing, through said control rod, and out through said compressed air exit port defined within said second side wall portion of said housing, when said control rod means is disposed at said second position, so as to therefore deflate the inflatable member.

2. The mechanism as set forth in claim 1, wherein:
said first and second angularly spaced positions are disposed approximately 90° apart from each other.

3. The mechanism as set forth in claim 1, wherein:
said fluid passageways defined within said control rod comprise an axially oriented fluid passageway leading to the inflation valve, a first air inlet port fluidically connected to said axially oriented fluid passageway, a second air inlet port fluidically connected to said axially oriented fluid passageway, and an outlet port fluidically connected to said axially oriented fluid passageway such that when said control rod is disposed at said first position, compressed air will enter said compressed air inlet port of said housing, said first air inlet port of said control rod, and said axially oriented fluid passageway leading to the inflation valve so as to inflate the inflatable member to be inflated, whereas when said control rod is disposed at said second position, compressed air will enter said compressed air inlet port of said housing, said second air inlet port of said control rod, and exit said outlet port of said control rod and said compressed air outlet port of said housing so as to cause air, disposed within the inflatable member, to be evacuated from the inflatable member in order to deflate the inflatable member.

4. The mechanism as set forth in claim 1, wherein:
said compressed air inlet port, defined upon said housing for permitting compressed air to enter said housing from the source of compressed air, is coaxially aligned with said compressed air outlet port defined within said housing for permitting the compressed air, entering said compressed air inlet port of said housing from the source of compressed air, to exit said housing when said control rod is disposed at said second position.

5. The mechanism as set forth in claim 3, wherein:
said second air inlet port of said control rod is coaxially aligned with said outlet port of said control rod.

6. The mechanism as set forth in claim 3, wherein:
said first air inlet port of said control rod is defined within a first side wall portion of said control rod means, said second air inlet port of said control rod is defined within a second side wall portion of said control rod, and said outlet port of said control rod is defined within a third side wall portion of said control rod.

7. The mechanism as set forth in claim 6, wherein:
said first air inlet port, defined within said first side wall portion of said control rod, is disposed at a position which is approximately 90° apart from either one of said second air inlet port, defined within said second side wall portion of said control rod, and said outlet port defined within said third side wall portion of said control rod.

8. The mechanism as set forth in claim 6, wherein:
said housing has an internal peripheral wall surface such that when said control rod is disposed at said first inflate position, said first air inlet port of said control rod will be coaxially aligned with said compressed air inlet port of said housing, however, said second air inlet port of said control rod means and said outlet port of said control rod means will be blocked off by said internal peripheral wall surface of said housing while a fourth side wall portion of said control rod will block off said compressed air outlet port of said housing, and when said control rod is disposed at said second deflate position, said first air inlet port of said control rod will be blocked off by said internal peripheral wall surface of said housing while said second air inlet port and said outlet port of said control rod will be respectively coaxially aligned with said compressed air inlet port and said compressed air outlet port of said housing.

9. The mechanism as set forth in claim 1, further comprising:
a control knob, disposed atop said control rod, for enabling said control rod to be manually moved between said first and second positions.

10. The mechanism as set forth in claim 1, further comprising:
structure defined upon said control rod for enabling said control rod to be moved axially downwardly as said control rod is rotatably moved from said first inflation position to said second inflation position such that said control rod will maintain the inflation valve at its open position so as to ensure the evacuation of the air from the inflatable member.

11. The mechanism as set forth in claim 10, wherein:
said structure defined upon said control rod for enabling said control rod to be moved axially downwardly as said control rod is rotatably moved from said first inflation position to said second deflation position comprises a spiral track for cooperating with a detent lug disposed upon an internal peripheral wall surface portion of said housing.

12. The mechanism as set forth in claim 11, wherein:
said spiral track comprises an angular extent of approximately 90°.

* * * * *